(12) United States Patent
Nishida

(10) Patent No.: US 10,350,667 B2
(45) Date of Patent: Jul. 16, 2019

(54) PRESS DEVICE

(71) Applicant: KOMATSU INDUSTRIES CORPORATION, Kanazawa-shi, Ishikawa (JP)

(72) Inventor: Kenji Nishida, Hakusan (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 306 days.

(21) Appl. No.: 15/519,589

(22) PCT Filed: Nov. 27, 2015

(86) PCT No.: PCT/JP2015/083478
§ 371 (c)(1),
(2) Date: Apr. 17, 2017

(87) PCT Pub. No.: WO2016/121216
PCT Pub. Date: Aug. 4, 2016

(65) Prior Publication Data
US 2017/0239704 A1 Aug. 24, 2017

(30) Foreign Application Priority Data
Jan. 28, 2015 (JP) .................. 2015-014439

(51) Int. Cl.
*B30B 15/26* (2006.01)
*B21D 37/04* (2006.01)
(Continued)

(52) U.S. Cl.
CPC ............ *B21D 37/04* (2013.01); *B21D 37/14* (2013.01); *B21D 37/147* (2013.01);
(Continued)

(58) Field of Classification Search
CPC ....... B30B 1/266; B30B 15/26; B30B 15/148; B30B 15/028; B21D 37/04; B21D 37/14; B21D 37/147
(Continued)

(56) References Cited

U.S. PATENT DOCUMENTS 7,516,695 B2    4/2009  Baba et al.
9,132,463 B2 *  9/2015  Ota et al. ............... B21D 24/14
                                                         72/443
(Continued)

FOREIGN PATENT DOCUMENTS

CN    101102885 A    1/2008
CN    101146670 A    3/2008
(Continued)

OTHER PUBLICATIONS

Office Action for the corresponding Chinese application No. 201580060002.2 dated Apr. 18, 2018.
(Continued)

*Primary Examiner* — Christopher M Koehler
*Assistant Examiner* — Bobby Yeonjin Kim
(74) *Attorney, Agent, or Firm* — Global IP Counselors, LLP

(57) ABSTRACT

The press device includes a press device body and moving bolsters. The press device body has a slide and a slide servomotor. The slide has upper dies attached thereto. The slide servomotor moves the slide up and down. The moving bolsters are able to move between a pressing position, which is a position on the inside of the press device body, and a die replacement position, which is a position on the outside of the press device body, and have lower dies disposed thereon. The moving bolsters have an electrical storage component, a travel motor, and wheels. The electrical storage component stores regenerative electrical power generated by the slide
(Continued)

servomotor in the pressing position. Electrical power is supplied from the electrical storage component to the travel motor. The wheels are driven by the travel motor.

4 Claims, 6 Drawing Sheets

(51) Int. Cl.
*H02K 11/22* (2016.01)
*H02K 11/30* (2016.01)
*B21D 37/14* (2006.01)
*B30B 15/02* (2006.01)
*G05B 15/02* (2006.01)
*H02J 7/00* (2006.01)
*H02J 7/14* (2006.01)
*H02K 7/10* (2006.01)
*H02K 7/116* (2006.01)

(52) U.S. Cl.
CPC .......... *B30B 15/028* (2013.01); *G05B 15/02* (2013.01); *H02J 7/0045* (2013.01); *H02J 7/14* (2013.01); *H02K 7/1004* (2013.01); *H02K 7/116* (2013.01); *H02K 11/22* (2016.01); *H02K 11/30* (2016.01)

(58) Field of Classification Search
USPC ...... 100/282, 918, 43, 48; 72/452.5, 453.13; 318/376, 625
See application file for complete search history.

(56) References Cited

U.S. PATENT DOCUMENTS

| 2006/0160684 A1* | 7/2006 | Springston ............ B29C 31/006 483/1 |
|---|---|---|
| 2008/0141751 A1 | 6/2008 | Baba et al. |
| 2008/0178652 A1 | 7/2008 | Baba et al. |
| 2011/0083487 A1 | 4/2011 | Ota et al. |
| 2014/0083313 A1 | 3/2014 | Schoellhammer et al. |

FOREIGN PATENT DOCUMENTS

| CN | 201158169 Y | 12/2008 |
|---|---|---|
| CN | 101722674 A | 6/2010 |
| CN | 102009488 A | 4/2011 |
| CN | 103223706 A | 7/2013 |
| CN | 104088581 A | 10/2014 |
| JP | 10-113728 A | 5/1998 |
| JP | 2001-191134 A | 7/2001 |
| JP | 2004-50259 A | 2/2004 |
| JP | 2006-297411 A | 11/2006 |
| JP | 2010-42427 A | 2/2010 |
| JP | 2011-83782 A | 4/2011 |
| JP | 2012192460 A | 10/2012 |
| JP | 3186426 U | 10/2013 |

OTHER PUBLICATIONS

The International Search Report for the corresponding international application No. PCT/JP2015/083478, dated Feb. 2, 2016.

* cited by examiner

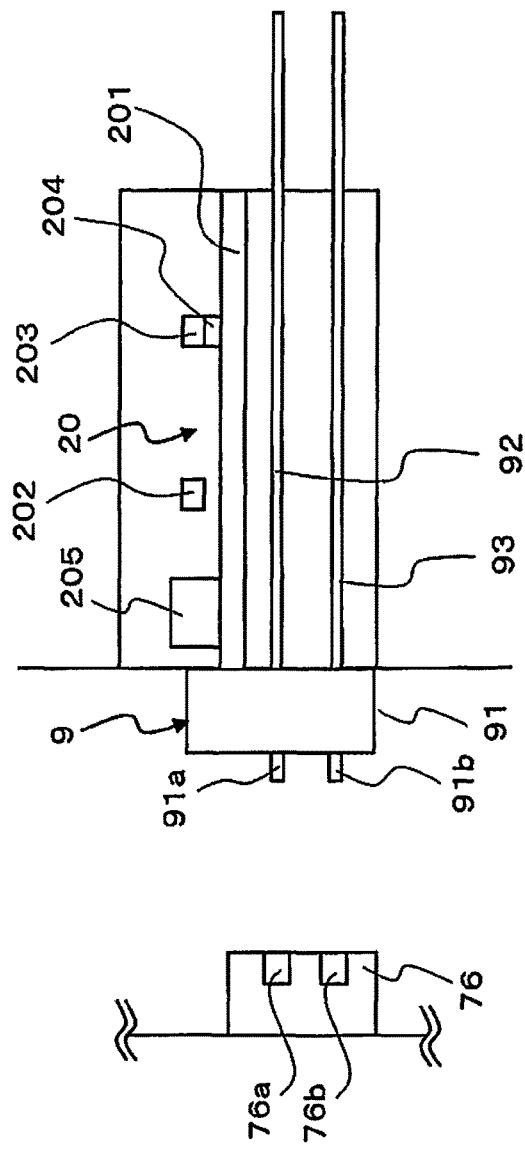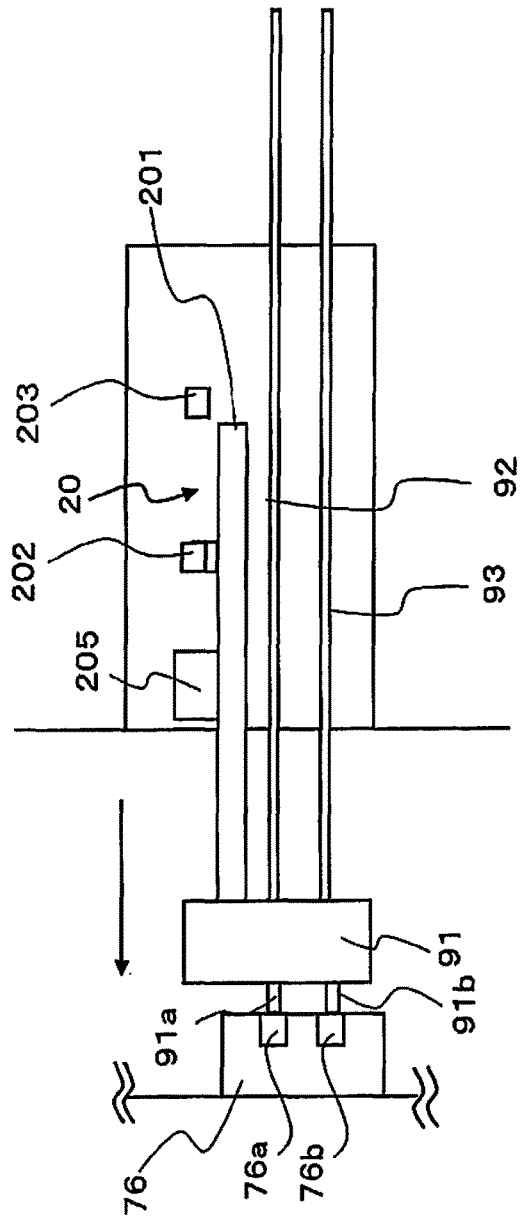
FIG. 5A
FIG. 5B

PRESS DEVICE

CROSS-REFERENCE TO RELATED APPLICATIONS

This application is a U.S. National stage application of International Application No. PCT/JP2015/083478, filed on Nov. 27, 2015. This U.S. National stage application claims priority under 35 U.S.C. § 119(a) to Japanese Patent Application No. 2015-014439, filed in Japan on Jan. 28, 2015, the entire contents of which are hereby incorporated herein by reference.

BACKGROUND

Field of the Invention

The present invention relates to a press device.

Description of the Related Art

Conventionally, a moving bolster that moves from the inside to the outside of a press device body with dies in place has been provided to a transfer press or other large press device. This moving bolster is provided in order to replace dies by off-line setup.

For example, with the moving bolster in Japanese Laid-Open Patent Application H10-113728, a cable is provided to transfer electrical power between the press device body and the moving bolster. The cable is kept under constant tension so that it will not waver even if the moving bolster should move.

Payout and storage of the cable, as well as the application of tension to the cable, are carried out by means a cable reel provided under the bottom face and a cable guide provided near the bottom face above the cable reel.

SUMMARY

However, the following problem is encountered with the above-mentioned conventional press device.

With the press device in the above-mentioned Japanese Laid-Open Patent Application H10-113728, since a cable reel has to be disposed by forming a space under the bottom face for disposing the cable reel, and also a cable guide has to be provided, the structure ends up being complicated.

The present invention is conceived in light of the above problem encountered with a conventional press device, and it is an object thereof to provide a press device which allows a moving bolster to move with a simple structure.

The press device pertaining to a first exemplary embodiment of the present invention has a press device body and a moving bolster. The press device body has a slide and a slide servomotor. An upper die can be attached to the lower face of the slide. The slide servomotor moves the slide up and down. The moving bolster is configured to be able to move between a pressing position, which is a position on the inside of the press device body, and a die replacement position, which is a position on the outside of the press device body. A lower die can be disposed on the moving bolster. The moving bolster has an electrical storage component, a travel motor, and travel wheels. The electrical storage component is configured to store regenerative electrical power generated by the slide servomotor in the pressing position. Electrical power is configured to be supplied from the electrical storage component to the travel motor. The travel wheels are configured to be driven by the travel motor.

Thus, the moving bolster has an electrical storage component, the travel motor is driven by electrical power stored in the electrical storage component, and the travel wheels rotate. Accordingly, there is no need to provide a cable for supplying electrical power between the press device body and the moving bolster, and cable-less moving bolster is the result.

Therefore, the moving bolster can be moved with a simple structure.

Also, since the regenerative electrical power of the slide servomotor that drives the slide is used as the electrical power for the moving bolster, energy consumption can be reduced.

The press device pertaining to a second exemplary embodiment of the present invention is the press device pertaining to the first exemplary embodiment of the present invention, wherein the press device body has a first electrical connector that can be electrically connected to the moving bolster when regenerative electrical power generated by the slide servomotor is stored in the electrical storage component. The moving bolster has a second electrical connector that can be electrically connected to the first electrical connector. The press device further comprises a driver. The driver is provided to the press device body or the moving bolster, and connects the first electrical connector and the second electrical connector by moving at least one of the first electrical connector and the second electrical connector when the regenerative electrical power generated by the slide servomotor is stored in the electrical storage component.

Consequently, when the moving bolster move to the pressing position, the moving bolster and the press device body can be electrically connected automatically. Therefore, the worker does not need to go on the inside of the press device, and electrical power can be stored in the moving bolster more easily.

The press device pertaining to the third invention is the press device pertaining to the second exemplary embodiment of the present invention, further comprising a crown and uprights. The crown supports the slide so that the slide can be raised and lowered. The uprights support the crown above the slide. The first electrical connector is provided to the uprights.

Thus, providing the first electrical connector to the uprights result in a simpler structure than when a first electrical connector is provided separately to the bed.

The press device pertaining to the fourth exemplary embodiment of the present invention is the press device pertaining to the first exemplary embodiment of the present invention, further comprising a die cushion and a die cushion servomotor. The die cushion is configured to produce a die cushion load on the slide. The die cushion servomotor is configured to drive the die cushion. The electrical storage component also stores the regenerative electrical power generated by the die cushion servomotor, along with the regenerative electrical power generated by the slide servomotor.

Thus, utilizing the regenerative electrical power generated by the servomotor that drives the die cushion results in a further reduction in energy consumption.

The present invention provides a press device with which a moving bolster can be moved with a simple structure.

BRIEF DESCRIPTION OF DRAWINGS

FIGS. 5A and 5B are diagrams illustrating the electrical connection configuration of a moving bolster and the press device body of the press device in FIG. 1.

DETAILED DESCRIPTION OF EXEMPLARY EMBODIMENTS

The press device of the present invention will now be described through reference to the drawings.

1. Configuration 1-1. Overview of Press Device

Figure 1:
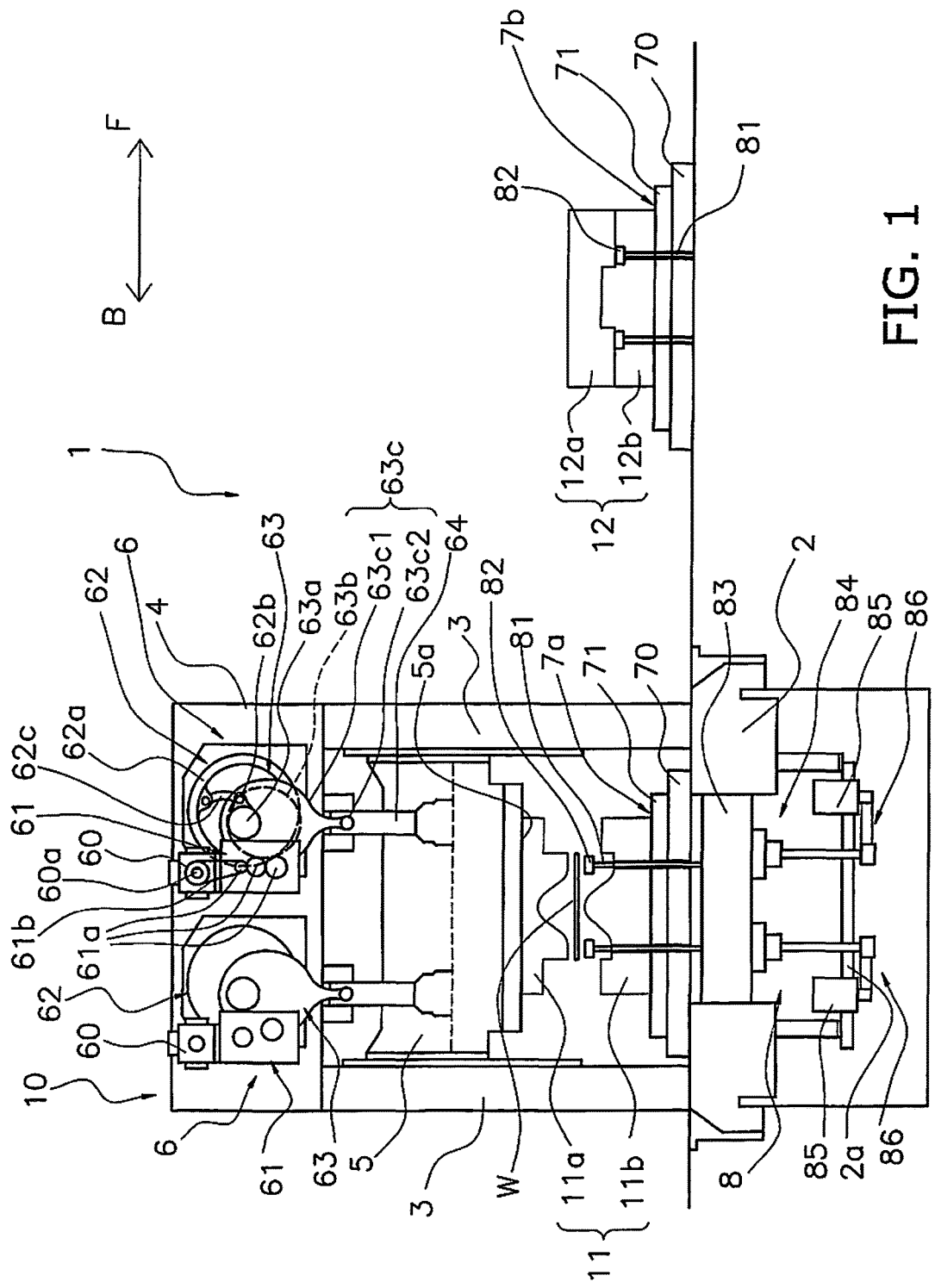
FIG. 1 is a simplified front view of the press device in an exemplary embodiment pertaining to the present invention.

FIG. 1 is a simplified front view of the configuration of a press device 1 in an exemplary embodiment pertaining to the present invention. The arrow F in FIG. 1 indicates the front direction of the press device 1, while the arrow B indicates the back direction of the press device 1.

The press device I in this exemplary embodiment comprises a press device body 10 and moving bolsters 7 (7a and 7b).

Figure 6:
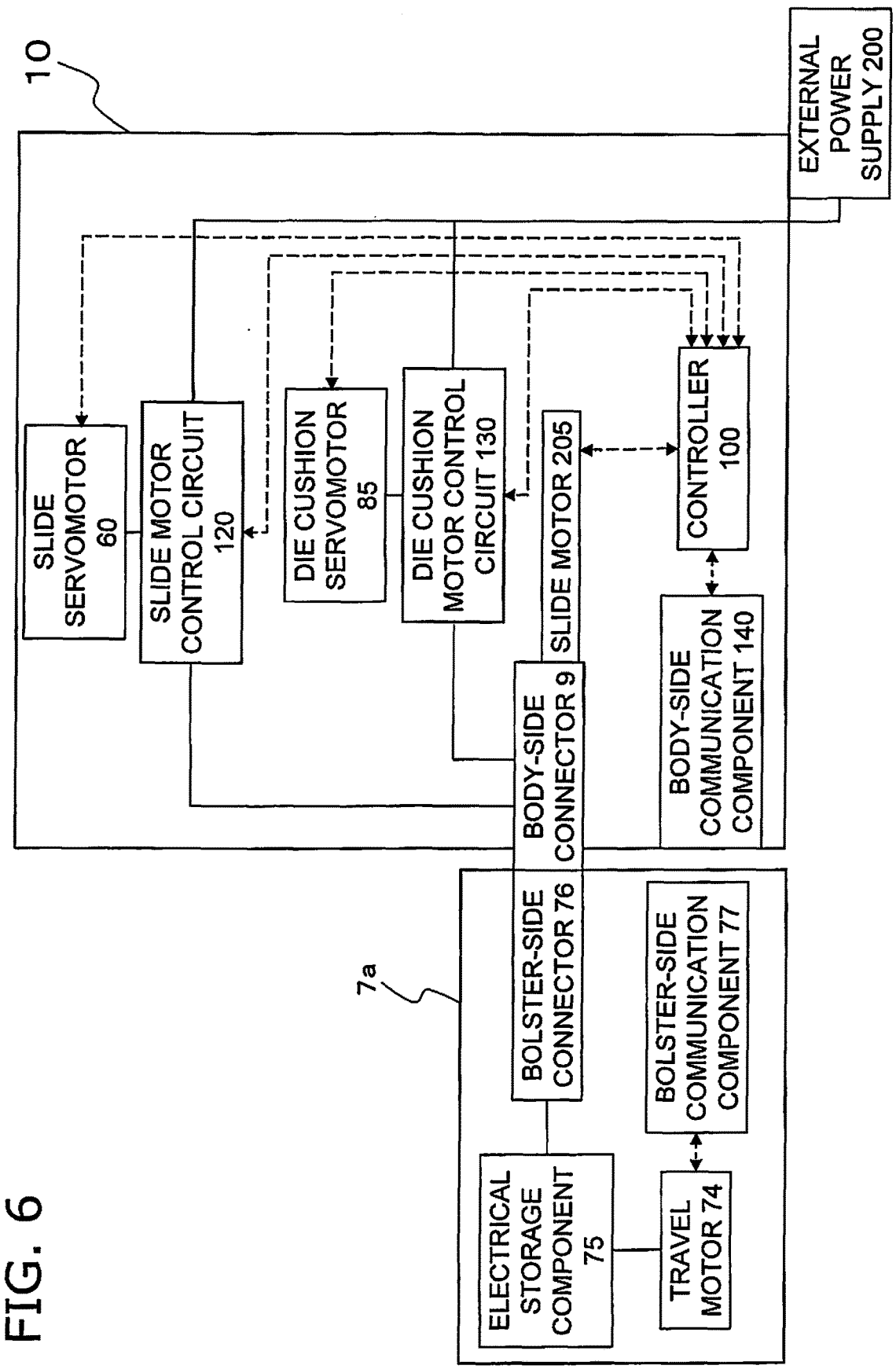
FIG. 6 is a block diagram of the control configuration of the press device in FIG. 1.

The press device body 10 mainly comprises a bed 2, uprights 3, a crown 4, a slide 5, slide drivers 6, a die cushion component 8, a body-side connector 9 (see FIG. 2A), a connector driver 20 (see FIG. 2A), and a controller 100 (see FIG. 6).

The bed 2 is embedded in the floor, and constitutes the foundation of the press device 1.

Figure 2A:
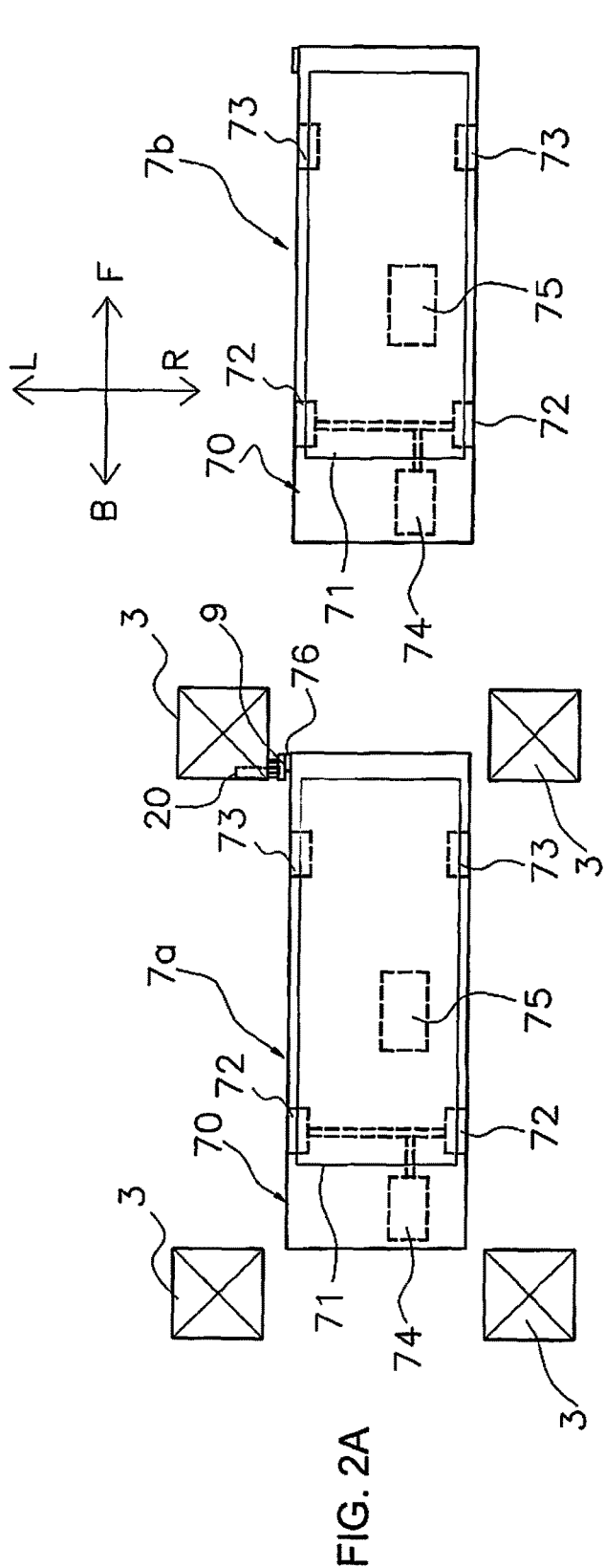
FIG. 2A is a plan view of the moving bolsters of the press device in FIG. 1.
Figure 2B:
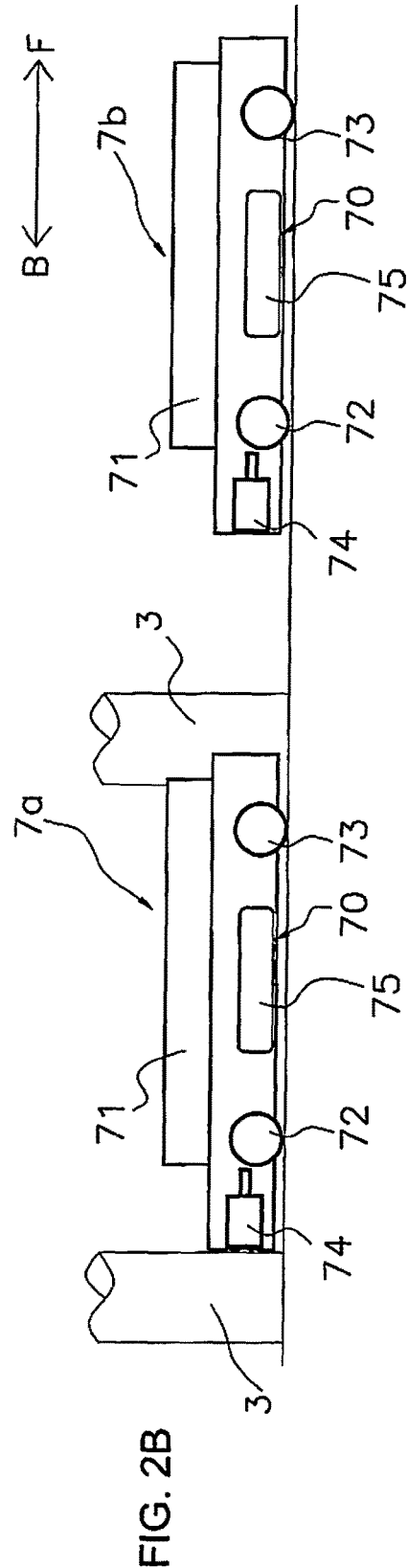
FIG. 2B is a front view of the moving bolsters of the press device in FIG. 1.

FIG. 2A is a plan view of the press device 1 as seen from above, but for the sake of description the crown 4 is not depicted. The uprights 3 are post-like members, and as shown in FIGS. 1, 2A and 2B, there are four of them disposed on the bed 2. The four uprights 3 are disposed so as to form the vertices of a rectangular shape in plan view. The arrow R in FIG. 2A indicates the right direction of the press device 1, and the arrow L indicates the left direction of the press device 1. FIG. 2B is a view of FIG. 2A as seen from the right side, and the two front uprights 3 are not depicted.

As shown in FIG. 1, the crown 4 is supported above by the four uprights 3. The slide 5 hangs down from the underside of the crown 4. The slide drivers 6 are provided to the crown 4, and raise and lower the slide 5 hanging from the underside of the crown 4.

An upper die 11a is removably attached by means of a die clamp (not shown) to the lower face 5a of the slide 5.

The slide drivers 6 are provided to the crown 4, and move the slide 5 in the up and down direction.

As shown in FIG. 2A, two moving bolsters 7a and 7b are such that one moving bolster 7a is disposed at a position on the inside of the press device body 10, and the other moving bolster 7b is disposed at a position on the outside of the press device body 10.

As shown in FIG. 1, a lower die 11b is disposed on the upper side of the moving bolster 7a. Also, a die 12 (upper die 12a and lower die 12b) of a different type from that of the die 11 (upper die 11a and lower die 11b) is placed on the upper side of the moving bolster 7b.

The die cushion component 8 produces a die cushion load on the slide 5 through a workpiece W.

The body-side connector 9 is provided to a side face (on the moving bolster 7a side) of one of the four uprights 3. The body-side connector 9 allows for electrical connection with a bolster-side connector 76 of the moving bolsters 7a and 7b.

The connector driver 20 moves the body-side connector 9 toward the bolster-side connector 76.

The controller 100 drives the operation of the slide drivers 6, the moving bolsters 7a and 7b, the die cushion component 8, the connector driver 20, and so forth.

The configuration of the various components will be described in detail below.

1-2. Slide Drivers

Two each of the slide drivers 6 are provided at the front and back, on the left and right sides, for a total of four of them. The slide drivers 6 support the slide 5 at four points.

As shown in FIG. 1, the slide drivers 6 each have a slide servomotor 60 (drive source), a first reducer 61 and a second reducer 62 that reduce the speed of rotation of the slide servomotor 60, an elevator 63 that converts speed-reduced rotary motion into reciprocal motion in the up and down direction, and a plunger 64 that is fixed at its lower end to the slide 5 and moves the slide 5 in the up and down direction.

The slide servomotors 60 are attached to the crown 4, and are disposed so that their drive shafts 60a run in the left and right direction.

The first reducers 61 are linked to the drive shafts 60a of the slide servomotors 60, and have a plurality of gears 61a that are linked together. A belt 61b goes around the gear 61a provided on the slide servomotor 60 side among a plurality of gears 61a and a pulley provided to the drive shaft 60a of the slide servomotor 60. These belts 61b transmit the rotational power of the slide servomotors 60 to the first reducers 61.

The second reducers 62 are Whitworth reducers, and further reduce the speed of the rotary motion that has been speed-reduced by the first reducers 61, and transmit the product to eccentric shafts 63a. The second reducers 62 each have a ring 62a with a gear formed around its outside, a crank member 62b that is fixed to the eccentric shaft 63a, and a linking member 62c that connects the ring 62a to the crank member 62b.

The rings 62a are rotatably supported via support members (not shown) with respect to the eccentric shafts 63a. The gears around the outside of the rings 62a mesh with the gears 61a of the first reducers 61.

The linking members 62c are substantially arc-shaped members. The linking members 62c are rotatably linked at one end to the inner periphery of the rings 62a, and are rotatably linked at the other end to the crank members 62b.

The elevators 63 each have an eccentric shaft 63a, an eccentric drum 63b that is fixed to the eccentric shaft 63a, and a connecting rod 63c that is connected to the eccentric drum 63b.

The eccentric shafts 63a are linked to the output shafts of the second reducers 62, and are rotatably supported by the crown 4. The eccentric drums 63b are disk-shaped, and are eccentric with respect to the eccentric shafts 63a. The eccentric drums 63b are formed integrally with the eccentric shafts 63a, and rotate eccentrically along with the rotation of the eccentric shafts 63a.

The connecting rods 63c each have a ring-shaped part 63c1 formed upward, and a rod-shaped part 63c2 protruding outward in the radial direction from the ring-shaped part 63c1.

With this configuration, the rotary power of the slide servomotors 60 is transmitted from the gears 61a of the first reducers 61 to the rings 62a of the second reducers 62. The rotary power is transmitted from the rings 62a, through the linking members 62c and the crank members 62b, to the eccentric shafts 63a of the elevators 63. Rotation of the eccentric shafts 63*a* causes the eccentric drums 63*b* to rotate eccentrically, and the rotary power is converted through the connecting rods 63*c* into raising and lowering power in the up and down direction. Consequently, the plungers 64 linked to the connecting rods 63*c* rise and fall in the up and down direction. This rise and fall of the plungers 64 causes the slide 5 attached to the lower ends of the plungers 64 to rise and fall.

1-3. Die Cushion Component

The die cushion component 8 has a plurality of cushion pins 81, a blank holder 82, a cushion pad 83, a die cushion 84, a die cushion servomotor 85, and a power transmission mechanism 86 that transmits the rotary power of the die cushion servomotor 85 to the cushion 84.

The cushion pins 81 are inserted so as to be able to move up and down in holes formed in the moving bolster 7*a* and the lower die 11*b*. The upper ends of the cushion pins 81 hit the blank holder 82. The lower ends of the cushion pins 81 hit the cushion pad 83 provided between the sides of the bed 2.

The blank holder 82 is disposed under the upper die 11*a* and above the lower die 11*b*. The blank holder 82 is pressed against the upper die 11*a*, with the workpiece W in between, when the slide 5 descends and the upper die 11*a* moves downward.

The cushion pad 83 is provided inside the bed 2, and receives the force of the slide 5. The cushion pad 83 is provided movably in the up and down direction within the bed 2. A beam 2*a* is provided to the inner wall face of the bed 2, and the die cushion component 8 is supported by the beam 2*a*.

Figure 3:
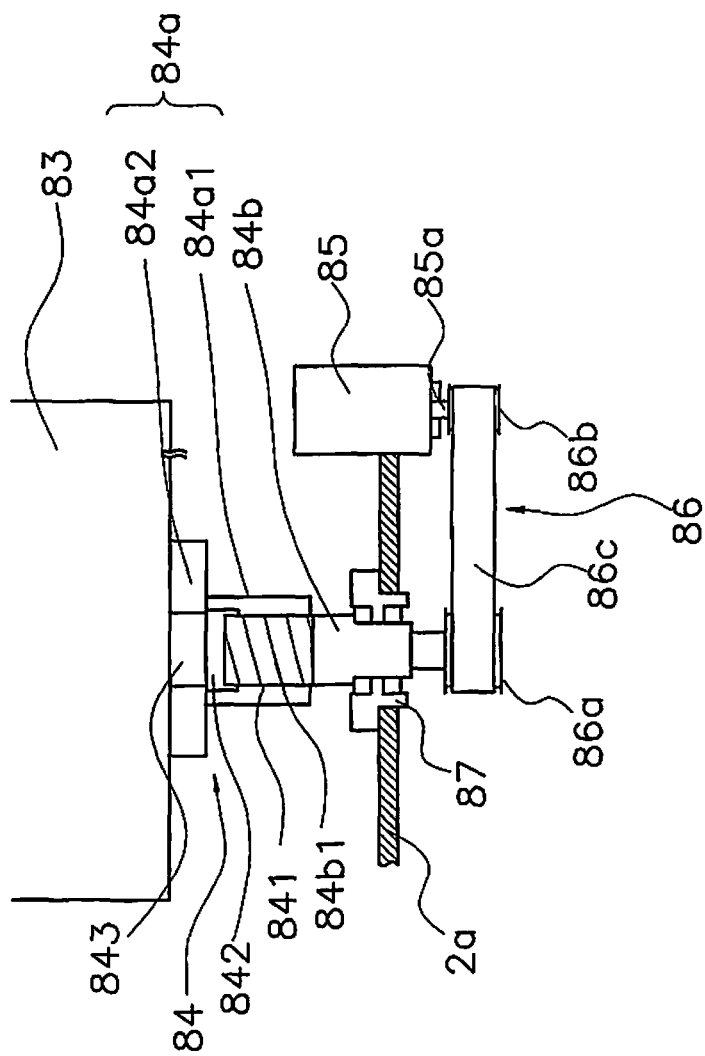
FIG. 3 shows the configuration of the die cushion component in the press device in FIG. 1.

FIG. 3 shows the configuration of the die cushion 84, the die cushion servomotor 85, and the power transmission mechanism 86.

As shown in FIG. 3, the die cushion 84 has a nut member 84*a* and a linking member 84*b*. The nut member 84*a* has a substantially cylindrical tube part 84*a*1 and a flange 84*a*2 that is configured integrally with the tube part 84*a*1.

The tube part 84*a*1 of the nut member 84*a* has a small-diameter first circular hollow part 841 in which male threads have been cut, and a large-diameter second circular hollow part 842 that communicates with the first circular hollow part 841 and which is not threaded. The flange 84*a*2 has a third circular hollow part 843 that communicates with the large-diameter second circular hollow part 842 and has a diameter slight smaller than that of the second circular hollow part 842, and is fixed to the bottom face of the cushion pad 83.

The linking member 84*b* is disposed coaxially with the rotational axis of a large pulley 86*a* that is part of the power transmission mechanism 86, and is rotatably fixed to the beam 2*a* via a bearing 87. A female thread 84*b*1 is formed above the linking member 84*b*, and the female thread 84*b*1 meshes with the male threads of the first circular hollow part 841 of the nut member 84*a*. Consequently, the nut member 84*a* and the linking member 84*b* are able to move relative to one another.

The die cushion servomotor 85 is fixed to the beam 2*a* so that its drive shaft 85*a* is parallel to the linking member 84*b*.

The power transmission mechanism 86 has the large pulley 86*a*, a small pulley 86*b*, and a belt 86*c*. The large pulley 86*a* is provided coaxially with the linking member 84*b*. The small pulley 86*b* is fixed to the drive shaft 85*a* of the die cushion servomotor 85. The belt 86*c* goes around the large pulley 86*a* and the small pulley 86*b*.

With the above configuration, the downward movement of the cushion pad 83 causes the nut member 84*a* to move downward, and produces a rotary force at the linking member 84*b*. This rotary force is transmitted through the power transmission mechanism 86 to the die cushion servomotor 85 side.

Meanwhile, when the die cushion servomotor 85 is driven, the rotary force produced by the die cushion servomotor 85 is transmitted through the power transmission mechanism 86 to the linking member 84*b*. The rotary force transmitted to the linking member 84*b* is converted into a force that moves the nut member 84*a* upward, and the cushion pad 83 moves upward.

Power is thus transmitted between the die cushion servomotor 85 and the cushion pad 83. The die cushion servomotor 85 moves the cushion pad 83 downward while generating an upward biasing force on the cushion pad 83.

A strain gauge, linear scale mechanism, or the like is provided to the side face of the cushion pad 83 so that the load produced at the cushion pad 83 and the position of the cushion pad 83 in the up and down direction are measured.

1-4. Moving Bolsters

As shown in FIG. 2, the two moving bolsters 7*a* and 7*b* are disposed such that the moving bolster 7*a* is on the inside of the press device body 10, while the moving bolster 7*b* is on the outside of the press device body 10. The position of the moving bolster 7*a* disposed inside the press device body 10 is the pressing position in which the pressing work is carried out. Also, the position of the moving bolster 7*b* disposed outside the press device body 10 is the die replacement position of the moving bolsters.

The moving bolsters 7*a* and 7*b* are configured the same, and as shown in FIG. 1, they each have a traveling part 70 and a bolster 71 disposed on the traveling part 70. As shown in FIG. 2, the traveling part 70 has a pair of left and right wheels 72, a pair of left and right wheels 73, a travel motor 74, an electrical storage component 75 that supplies electrical power to the travel motor 74, and a bolster-side connector 76 that is connected to the press device body 10 in order to store electrical power in the electrical storage component 75.

The travel motor 74 rotationally drives the wheels 72. The wheels 73 passively rotate as a result of the drive of the wheels 72.

The electrical storage component 75 is electrically connected to the bolster-side connector 76, and stores electrical power supplied from the press device body 10 as discussed below. A capacitor, battery, or the like can be used as the electrical storage component 75.

Figure 4:
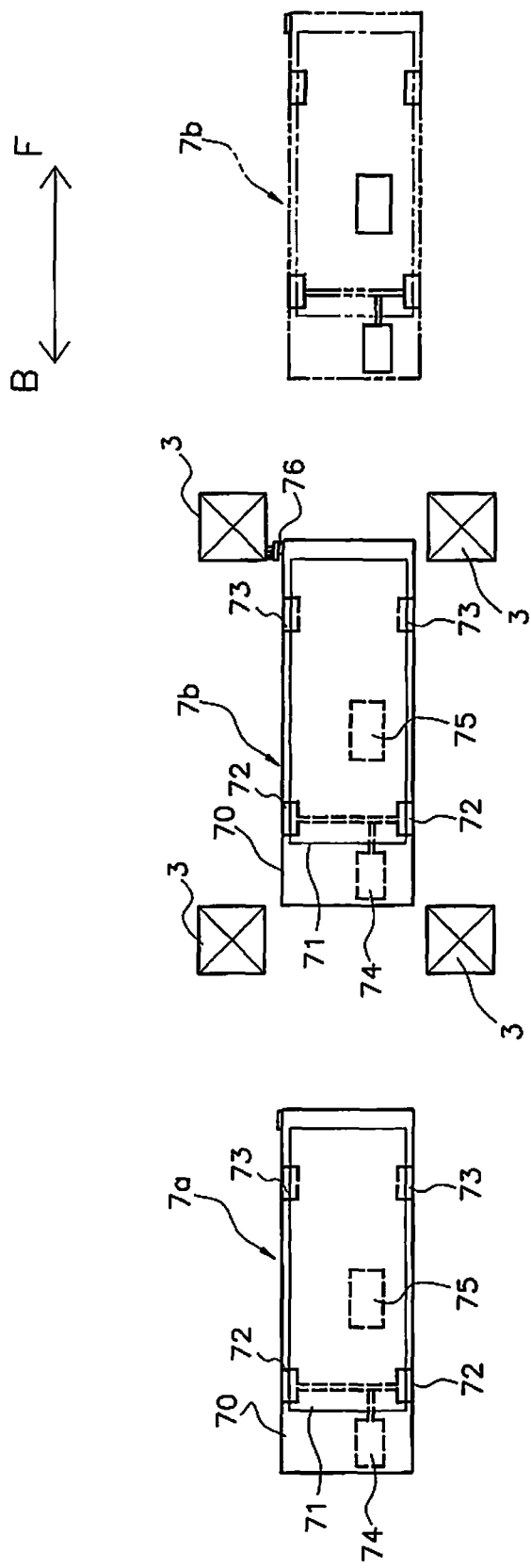
FIG. 4 is a plan view illustrating the movement of the moving bolsters of the press device in FIG. 1.

FIG. 4 shows the state when the moving bolster 7*a* has moved to the die replacement position, and the moving bolster 7*b* has moved to the pressing position. The state in FIG. 4 results when the moving bolster 7*a* and the moving bolster 7*b* move backward from the state shown in FIG. 2A. In this state, the die installed on the moving bolster 7*a* is replaced with another type.

Since the amount of movement of the moving bolsters 7*a* and 7*b* is predetermined, the moving bolsters 7*a* and 7*b* can be moved accurately from the pressing position to the die replacement position by providing a rotary encoder that senses the amount of rotation of the travel motor 74, for example. Also, the movement of the moving bolsters 7*a* and 7*b* may be sensed by providing a photosensor or the like at the die replacement position and the pressing position.

The wheels 72 and 73 of the moving bolsters 7*a* and 7*b* move within the traveling part 70 at the pressing position, the lower face of the traveling part 70 hits the bed 2, and pressing is performed.

1-5. Body-side and Bolster-side Connectors

FIG. 5A shows the state when one of the moving bolsters 7a and 7b has moved to the pressing position, before the body-side connector 9 moves. FIG. 5B shows the state when the bolster-side connector 76 and the body-side connector 9 have been electrically connected.

The bolster-side connector 76 is provided to the traveling part 70 so as to be opposite a side face of the upright 3 in the pressing position. The bolster-side connector 76 has a positive charging terminal 76a and a negative charging terminal 76b exposed facing the outside of the traveling part 70. The positive charging terminal 76a and the negative charging terminal 76b are connected to the electrical storage component 75 via cables, etc.

The body-side connector 9 has a positive charging terminal 91a and a negative charging terminal 91b opposite the bolster-side connector 76. A cable 92 is connected to the positive charging terminal 91a, and a cable 93 is connected to the negative charging terminal 91b.

The connector driver 20 that slides the body-side connector 9 toward the bolster-side connector 76 is provided to the upright 3. The connector driver 20 has a slide member 201, a first photosensor 202, a second photosensor 203, a shield plate 204, and a slide motor 205 that moves the slide member 201. The distal end of the slide member 201 is fixed to the body-side connector 9. The slide member 201 can be moved by the slide motor 205 in the lengthwise direction toward the moving bolster 7 disposed in the pressing position. There are no particular restrictions on the configuration for moving the slide member 201 with the slide motor 205, and a ball screw mechanism or the like can be used, for example. This movement of the slide member 201 allows the body-side connector 9 to move toward the bolster-side connector 76.

The first photosensor 202 and the second photosensor 203 are provided spaced apart by a specific distance along the slide member 201. The first photosensor 202 is disposed further to the outside than the second photosensor 203. Further, the shield plate 204 is provided to the slide member 201. The first photosensor 202 and the second photosensor 203 both have a light emitter and a light receiver. The first photosensor 202 and the second photosensor 203 detect the shield plate 204 when the shield plate 204 moves between the light emitter and the light receiver and the light from the light emitter is blocked. This allows the position of the slide member 201 to be sensed.

As shown in FIG. 5A, when one of the moving bolsters 7a and 7b has moved from the die replacement position to the pressing position, the shield plate 204 is in a state of blocking the second photosensor 203. That is, the body-side connector 9 is located on the upright 3 side.

When the controller 100 senses that one of the moving bolsters 7a and 7b has reached the pressing position, the slide motor 205 is driven, and the slide member 201 is moved toward the bolster-side connector 76. The movement of the slide member 201 causes the body-side connector 9 to move toward the bolster-side connector 76, and when the positive charging terminal 91a and the negative charging terminal 91b hit the positive charging terminal 76a and the negative charging terminal 76b, the shield plate 204 blocks the first photosensor 202, and movement of the slide member 201 stops.

Here, the positive charging terminal 91a and the negative charging terminal 91b are biased to the side of the positive charging terminal 76a and the negative charging terminal 76b by spring members. When the configuration is such that the shield plate 204 blocks the first photosensor 202 within the stroke of the spring members, the positive charging terminal 91a and the negative charging terminal 91b are prevented from hitting the positive charging terminal 76a and the negative charging terminal 76b too hard.

1-6. Control Configuration

FIG. 6 shows the configuration of the electrical connections and the control configuration of the press device in this exemplary embodiment.

The slide servomotors 60 that move the slide 5 up and down and the die cushion servomotor 85 that drives the die cushion 84 are controlled by the controller 100 to perform pressing.

Also, the slide servomotors 60 are electrically connected via a slide motor control circuit 120 to an external power supply 200 and the body-side connector 9. Also, the die cushion servomotor 85 is electrically connected via a die cushion motor control circuit 130 to the external power supply 200 and the body-side connector 9.

The slide motor control circuit 120 supplies electrical power from the external power supply 200 to the slide servomotors 60 during powered operation of the slide servomotors 60. The slide motor control circuit 120 also outputs the regenerative electrical power generated by the slide servomotors 60 to the body-side connector 9 during regenerative operation of the slide servomotors 60. The slide motor control circuit 120 has a switching element, etc., and operates the switching element or the like to switch between powered operation and regenerative operation at the command of the controller 100.

The die cushion motor control circuit 130 supplies electrical power from the external power supply 200 to the die cushion servomotor 85 during powered operation of the die cushion servomotor 85. The die cushion motor control circuit 130 also outputs regenerative electrical power generated by the die cushion servomotor 85 to the body-side connector 9 during regenerative operation of the die cushion servomotor 85.

The controller 100 controls the slide motor control circuit 120 and the die cushion motor control circuit 130, drives the slide servomotors 60 and the die cushion servomotor 85 with electrical power from the external power supply 200 during powered operation, and supplies regenerative electrical power produced by the slide servomotors 60 and the die cushion servomotor 85 to the body-side connector 9 during regenerative operation. The electrical power supplied to the body-side connector 9 is stored in the electrical storage component 75. Also, the controller 100 controls the slide motor 205 that slides the body-side connector 9.

A body-side communication component 140 is provided to the press device body 10, and a bolster-side communication component 77 is provided to the moving bolsters 7a and 7b. The controller 100 controls travel of the moving bolsters 7 by communicating with the moving bolsters 7a and 7b wirelessly, etc., via the body-side communication component 140 and the bolster-side communication component 77.

2. Operation

For example, in the state in FIGS. 1, 2A and 2B, when a die 11 installed on the moving bolster 7a is to be replaced, the controller 100 drives the slide motor 205 so that the body-side connector 9 is moved to the upright 3 side, away from the bolster-side connector 76. That is, the bolster-side connector 76 moves from the state in FIG. 5B to the state in FIG. 5A. The controller 100 receives a signal indicating that the second photosensor 203 has detected the shield plate 204, and detects that the body-side connector 9 has moved to the upright 3 side.

Next, the controller 100 sends a command through the body-side communication component 140 to the moving bolsters 7a and 7b to move the moving bolsters 7a and 7b to the rear side (the arrow B direction). When the moving bolster 7a moves from the pressing position to the die replacement position, and the moving bolster 7b moves from the die replacement position to the pressing position, the controller 100 stops the moving bolsters 7a and 7b. In FIG. 4, the moving bolster 7b disposed in the die replacement position is indicated by imaginary lines (two-dot chain lines). That is, the die replacement position of the moving bolster 7a is on the rear side of the press device body 10, and the die replacement position of the moving bolster 7b is on the front side of the press device body 10.

When the moving bolster 7b is in the pressing position, the controller 100 drives the slide motor 205 as shown in FIGS. 5A and 5B, bringing the body-side connector 9 into contact with the bolster-side connector 76. More precisely, the controller 100 receives a signal indicating that a first photosensor 123 has detected the shield plate 204, and detects that the body-side connector 9 has come into contact with the bolster-side connector 76.

Pressing is performed in this state, and the regenerative electrical power of the slide servomotors 60 and the die cushion servomotor 85 is stored in the electrical storage component 75 of the moving bolster 7b as shown in FIG. 6.

Meanwhile, the die is replaced on the moving bolster 7a side while pressing is being performed with the die 12 (see FIG. 1) installed on the moving bolster 7b.

The press device 1 in the above exemplary embodiment comprises the press device body 10 and the moving bolsters 7a and 7b. The press device body 10 has the slide 5 and the slide servomotors 60. The upper dies 11a and 12a are able to be attached to the lower face 5a of the slide 5. The slide servomotors 60 are configured to move the slide 5 up and down. The moving bolsters 7a and 7b are able to move between a pressing position, which is a position on the inside of the press device body 10, and a die replacement position, which is a position on the outside of the press device body 10, and the lower dies 11b and 12b are able to be installed on the bolsters 7a and 7b. The moving bolsters 7a and 7b have the electrical storage component 75, the travel motor 74, and the wheels 72 (an example of travel wheels). The electrical storage component 75 stores the regenerated power produced by the slide servomotors 60 in the pressing position. The travel motor 74 is supplied with electrical power from the electrical storage component 75. The wheels 72 are driven by the travel motor 74.

Thus, the moving bolsters 7a and 7b each have an electrical storage component 75, the travel motor 74 is driven by the electrical power stored in the electrical storage component 75, and this causes the wheels 72 to rotate. Therefore, there is no need to provide a cable for electrical power supply between the press device body 10 and the moving bolsters 7a and 7b, so cable-less moving bolsters 7a and 7b can be achieved.

Therefore, the moving bolsters 7a and 7b can be moved by a simple structure.

Also, since the regenerative electrical power of the slide servomotors 60 that drives the slide 5 is used as the power for the moving bolsters 7a and 7b, energy consumption can be reduced.

The press device 1 in the above exemplary embodiment further comprises the body-side connector 9 (an example of a first electrical connector), the bolster-side connector 76 (an example of a second electrical connector), and the connector driver 20 (an example of a driver).

The body-side connector 9 is provided to the press device body 10, and is electrically connected to the moving bolsters 7a or 7b when the regenerated power produced by the slide servomotors 60 is stored in the electrical storage component 75. The bolster-side connector 76 is provided to the moving bolsters 7a and 7b, and is electrically connected to the body-side connector 9. The connector driver 20 is provided to the press device body 10 or the moving bolsters 7a and 7b, and connects the body-side connector 9 and the bolster-side connector 76 by driving at least one of the body-side connector 9 and the bolster-side connector 76 when the regenerative electrical power produced by the slide servomotors 60 is stored in the electrical storage component 75.

Consequently, when a moving bolster moves to the pressing position, the moving bolster and the press device body are electrically connected automatically. Therefore, the worker does not need to go on the inside of the press device, and power can be stored in the moving bolsters more easily.

The press device 1 in the above exemplary embodiment further comprises the crown 4 and the uprights 3. The crown 4 supports the slide 5 so that it can move up and down. The uprights 3 support the crown 4 above the slide 5. The body-side connector 9 is provided to the uprights 3.

Thus, providing the body-side connector 9 to the uprights 3 affords a structure that is simpler than when the body-side connector 9 is provided separately to the bed 2.

The press device 1 in the above exemplary embodiment further comprises the die cushion 84 and the die cushion servomotor 85. The die cushion 84 produces a die cushion load on the slide 5. The die cushion servomotor 85 drives the die cushion. The electrical storage component 75 stores the regenerative electrical power produced by the die cushion servomotor 85 along with the regenerative electrical power produced by the slide servomotors 60.

Thus, utilizing the regenerative electrical power produced by the die cushion servomotor 85 that drives the die cushion 84 affords a greater reduction in energy consumption.

An exemplary embodiment of the present invention is described above, but the present invention is not limited to or by the above exemplary embodiment, and various modifications are possible without departing from the gist of the invention.

The press device 1 in the above exemplary embodiment comprises the die cushion component 8, but the die cushion component 8 need not be provided. In this case, the only electrical power stored in the electrical storage component 75 will be the regenerative electrical power of the slide servomotors 60.

The press device 1 in the above exemplary embodiment is provided with the two moving bolsters 7a and 7b, since the stop of the press operation is for only a short time, but a single moving bolster may be provided instead.

With the press device 1 in the above exemplary embodiment, the connector driver 20 is provided on the press device body 10 side, and the body-side connector 9 moves toward the bolster-side connector 76, but a connector driver may instead be provided on the moving bolster side, and the bolster-side connector 76 may move toward the body-side connector 9.

Furthermore, the connector driver 20 need not be provided to the press device 1. That is, the worker may connect the bolster-side connector 76 and the body-side connector 9.

In the above exemplary embodiment, only the regenerative electrical power produced by the slide servomotors 60 and the die cushion servomotor 85 is stored in the electrical storage component 75, but a monitor for tracking the charging state of the electrical storage component 75 may be provided, and power may be supplied from the external power supply 200 if the charge of the electrical storage component 75 is too low.

A monitor for tracking the charging state of the electrical storage component 75 may be provided, and the controller 100 may control the slide motor control circuit 120 and the die cushion motor control circuit 130 so that the supply of regenerated power to the electrical storage component 75 is halted in the event of overcharging.

The press device of the present invention has the effect of allowing moving bolsters to move by means of a simple structure, and is useful as a large press device, such as a transfer press.

The invention claimed is:

1. A press device, comprising:
   a press device body having a slide and a slide servomotor configured to move the slide up and down, a lower face of the slide being configured to have an upper die attached thereto; and
   a moving bolster configured to be moveable between a pressing position, which is a position on an inside of the press device body, and a die replacement position, which is a position on an outside of the press device body, the moving bolster being configured to have a lower die disposed thereon,
   the moving bolster including
      an electrical storage component configured to store regenerative electrical power generated by the slide servomotor in the pressing position;
      a travel motor to which electrical power is configured to be supplied from the electrical storage component; and
      wheels configured to be driven by the travel motor.

2. The press device according to claim 1, wherein
   the press device body has a first electrical connector configured to be electrically connected to the moving bolster when regenerative electrical power generated by the slide servomotor is stored in the electrical storage component,
   the moving bolster has a second electrical connector configured to be electrically connected to the first electrical connector, and
   the press device including a driver provided to the press device body or the moving bolster, the driver being configured to connect the first electrical connector and the second electrical connector by moving at least one of the first electrical connector and the second electrical connector when the regenerative electrical power generated by the slide servomotor is stored in the electrical storage component.

3. The press device according to claim 2, further comprising
   a crown supporting the slide so that the slide can be raised and lowered; and
   uprights supporting the crown above the slide,
   the first electrical connector being provided to the uprights.

4. The press device according to claim 1, further comprising
   a die cushion configured to produce a die cushion load on the slide; and
   a die cushion servomotor configured to drive the die cushion,
   the electrical storage component also storing the regenerative electrical power generated by the die cushion servomotor, along with the regenerative electrical power generated by the slide servomotor.

* * * * *